(No Model.)
W. J. CAHILL.
BALL COCK.
No. 418,162. Patented Dec. 31, 1889.
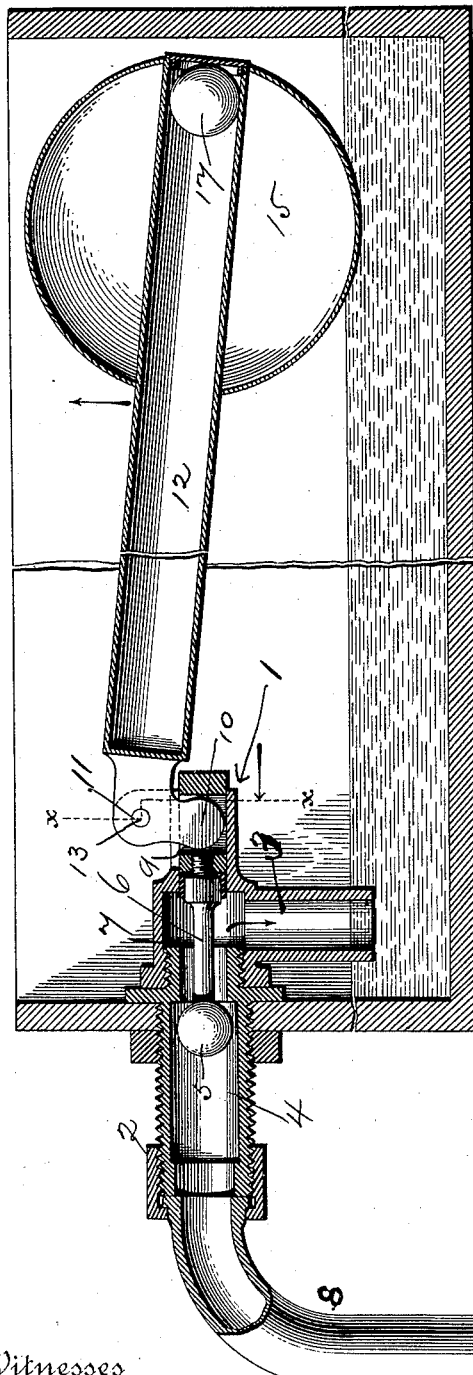
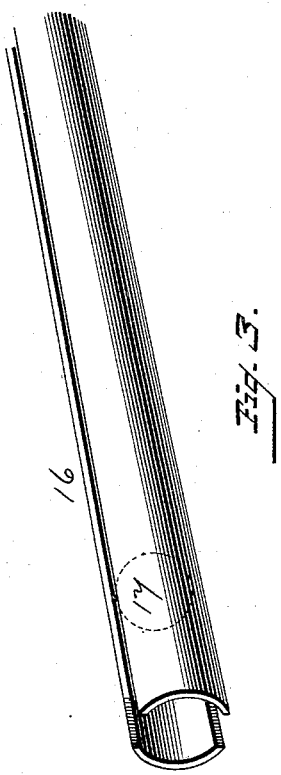
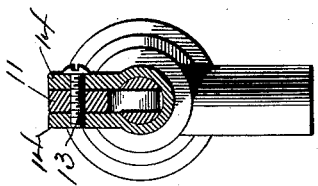
Witnesses
Inventor
William J. Cahill
By his Attorney

UNITED STATES PATENT OFFICE.

WILLIAM J. CAHILL, OF PITTSFIELD, MASSACHUSETTS.

BALL-COCK.

SPECIFICATION forming part of Letters Patent No. 418,162, dated December 31, 1889.

Application filed October 2, 1889. Serial No. 325,747. (No model.)

*To all whom it may concern:*

Be it known that I, WILLIAM J. CAHILL, a citizen of the United States, residing at Pittsfield, in the county of Berkshire and State of Massachusetts, have invented certain new and useful Improvements in Ball-Cocks; and I do hereby declare the following to be a full, clear, and exact description of the invention, such as will enable others skilled in the art to which it appertains to make and use the same.

This invention relates to certain improvements in ball-cocks, as hereinafter set forth.

In the accompanying drawings, Figure 1 represents a side elevation, and Fig. 2 a longitudinal section on the line *a a* of Fig. 1, illustrating my improvements. Fig. 3 represents a modified form of float-rod.

Where the pressure of the water-supply is great, some inconvenience and annoyance are experienced, owing to whistling noises in the pipes during the filling of the tank or cistern. Difficulty has, moreover, been experienced in completely shutting off the water-supply at the proper time when it is at high pressure. The object of my invention is to remedy such defects, to prevent the leaking of the tank-supply cock, and to cause the automatic complete and noiseless closure of the supply-pipe.

1 represents the cock, which is formed in sections to facilitate examination, cleaning, placing in and removal from position, &c.

2 represents a threaded nut, which is loose upon the nozzle 3 of the cock and removably connects the same and the exteriorily-threaded pipe-joint 4. Within this latter is contained a ball-valve 5, attached to the inner end of a rod or slide 6, contained within and reciprocating, as hereinafter explained, within the pipe-section 7, which is connected by suitable means, as by a pipe 8, with the main. The rear end of the rod or slide 6 is vertically slotted, as at 9, to receive a lug or flange 10 on the inner end of a joint or coupling 11, to which the float-rod 12 is attached. This joint 11 is pivotally journaled at 13 between flanges or ears 14 on the pipe-section 7. It will thus be apparent that as the float-rod 12 rises and falls it will correspondingly rock said joint or coupling 11 upon its pivot, and thus reciprocate the rod or slide 6 either forwardly or rearwardly within the pipe-section 7. As the level of the water within the tank decreases, the float 15 and the outer end of the float-rod 12 descend and draw the slide or rod 6 and the thereto-connected ball-valve 5 rearwardly a sufficient distance to permit of water passing from the main to and through the nozzle 3 to the tank. As the tank fills, the float and float-rod rise and cause the projection inward of the slide or rod 6, which, as it passes inward, forces the ball-valve against the front end of the pipe section or joint 4 to close the same, the pressure of water within the pipe assisting in maintaining said ball-valve in closed position, and thereby preventing water leaking therethrough, the circular form of the ball-valve insuring an effective packing of the pipe and preventing the adherence thereto of foreign matter, as dirt or mud, to impede the closure of said valve against its seat, as, the water flowing entirely around and over the same, it is constantly kept clean.

In order to assist the float and float-rod in their reciprocal movements and insure the operation thereof at the proper times, I construct the float-rod either in the form of a tube 12 or else of dual form, as shown at 16. Within this tube, or between the two-part rod 16, as the case may be, I place a ball-weight 17, which will operate by gravity, as will be readily understood upon reference to the drawings herewith, to assist in alternately lowering or raising the outer end of the float-rod. This weight insures the uniform and positive automatic action of the float-rod and parts connected therewith and insures the operation of the float at all proper times, assisting, as it does, the gravity action of the float as the level of the water in the tank decreases, and also, by its tendency to roll back as the float is raised by the increase in the level of the water in the tank while filling, assisting in the raising of said float. This ball-weight furthermore overcomes any tendency there may be, by reason of the binding of the reciprocating parts, to a failure to properly operate.

The float-rod may be connected with the joint 11 in any suitable way, as by a threaded connection, as shown, or by a screw, bolt, or other device connecting the two parts together.

By my construction the ball-valve remains in retracted position until the tank is full. That result having been reached, the ball-weight automatically rolls to its foremost position and causes the projection to its foremost position of the slide or rod 6, thereby forcing the ball-valve to its seat and immediately and noiselessly shutting off the flow of water to the tank.

Where a flat valve is employed to seal the water-outlet to the tank, when the pressure of the water is great such valve is liable to be forced by such pressure out of effective shape or position sufficiently to permit of water passing through (as a leak) the cock and whistling. By employing a round ball of pliant rubber, as I do, the only effect of such superior force and pressure of water within the cock when the valve is closed will be to press the ball closely and firmly upon and within its seat, so as to completely close the tank-supply opening to the nozzle.

What I claim is—

1. A ball-cock having a suitable nozzle and water-supply connection, a ball-valve contained within the cock, a rod or slide connected with said ball-valve and adapted to reciprocate within the cock to respectively project said ball-valve into closed position within its seat and retract the same to open position, a float, a rod or arm connecting said float and slide, and a weight loosely supported upon said float rod or arm for the purpose of assisting the float and parts connected therewith in their reciprocal movements, substantially as and for the purposes set forth.

2. A ball-cock consisting of a sectional pipe, a nozzle, and a water-main connection, a ball-valve contained within said pipe and adapted to reciprocate therein, a float, devices, as rods, connecting said float and ball-valve to secure the reciprocation of the latter, and a weight having loose bearing upon the float-rod, substantially as and for the purposes set forth.

In testimony whereof I affix my signature, in the presence of two witnesses, this 4th day of March, 1889.

WILLIAM J. CAHILL.

Witnesses:
DANIEL H. O'CONNELL,
EDWARD M. ADAMS.